(12) United States Patent
Schmitz

(10) Patent No.: US 9,669,481 B1
(45) Date of Patent: Jun. 6, 2017

(54) SOLDERING TOOL

(71) Applicant: RAPTOR EQUIPMENT, LLC., Boise, ID (US)

(72) Inventor: Austin K. Schmitz, Boise, ID (US)

(73) Assignee: RAPTOR EQUIPMENT, LLC, Boise, ID (US)

( * ) Notice: Subject to any disclaimer, the term of this patent is extended or adjusted under 35 U.S.C. 154(b) by 363 days.

(21) Appl. No.: 14/242,862

(22) Filed: Apr. 1, 2014

Related U.S. Application Data

(60) Provisional application No. 61/807,166, filed on Apr. 1, 2013.

(51) Int. Cl.
*B23K 3/03* (2006.01)
*B23K 1/00* (2006.01)

(52) U.S. Cl.
CPC .......... *B23K 3/0323* (2013.01); *B23K 1/0004* (2013.01); *B23K 3/0338* (2013.01)

(58) Field of Classification Search
CPC ........ B23K 3/03; B23K 26/00; B23K 3/0323; B23K 3/0338; B23K 1/0004
USPC .................. 219/121.11, 227, 229, 240, 85.16
See application file for complete search history.

(56) References Cited

U.S. PATENT DOCUMENTS

| | | | | |
|---|---|---|---|---|
| 3,412,233 A | * | 11/1968 | Wilkie | B23K 3/0476 219/225 |
| 6,367,688 B1 | * | 4/2002 | Roth | B23K 3/0476 219/230 |
| 2011/0288546 A1 | * | 11/2011 | Abbott | A61B 18/085 606/41 |

OTHER PUBLICATIONS

Luma Soldering Pliers, available at http://www.lumaelectricco.com/soldering-pliers.php (last accessed Mar. 26, 2014).
REMS Hot Dog 2—Electric soldering pliers, available at http://www.rems.de/soldering-brazing/electric-soldering-pliers/rems-hot-dog-2.aspx (last accessed Oct. 17, 2014).

* cited by examiner

*Primary Examiner* — Samuel M Heinrich
(74) *Attorney, Agent, or Firm* — Jeffrey Parry Intellectual Property Law Group PLLC; Jeffrey C. Parry

(57) ABSTRACT

The present disclosure comprises methods, apparatus, components, and techniques for soldering. A soldering tool includes opposing jaw pieces adapted to grip and/or compress work pieces while applying heat. The work pieces can be heated to a temperature at or above the melting point of a solder material, whereupon the solder may be melted and applied at the work pieces. The soldering tool may be removed from the work pieces, thereby allowing the solder to solidify and form a soldered joint. Soldering tools may be powered by portable, rechargeable, and/or detachable battery packs that are readily accessible and commonly used for a wide variety of hand-operated power tools.

19 Claims, 8 Drawing Sheets

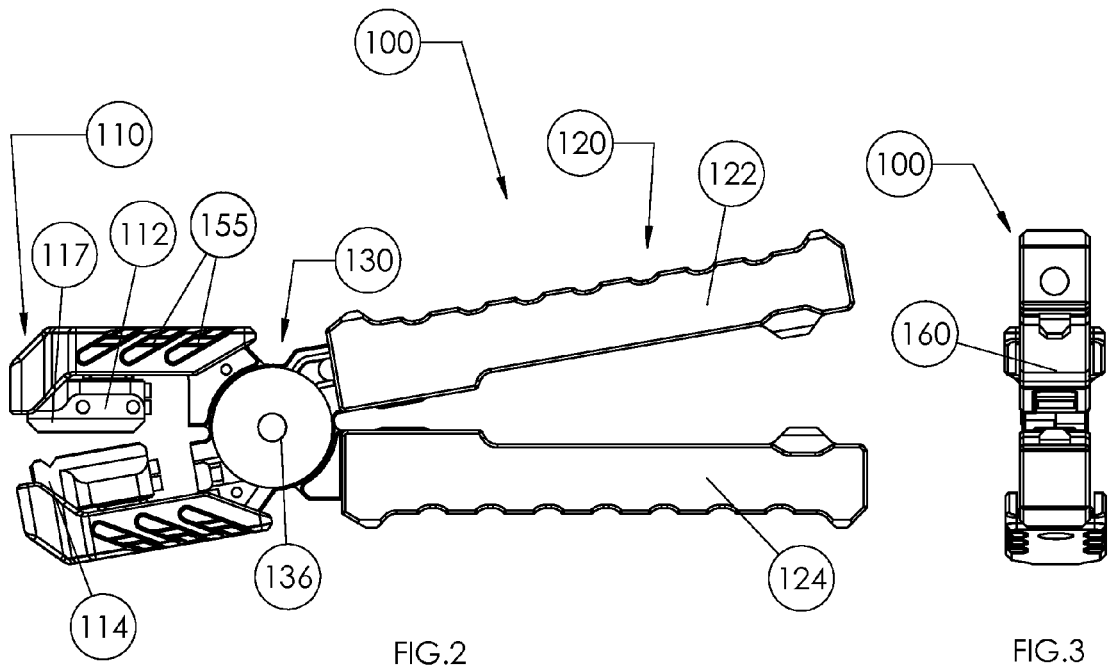
FIG.2
FIG.3
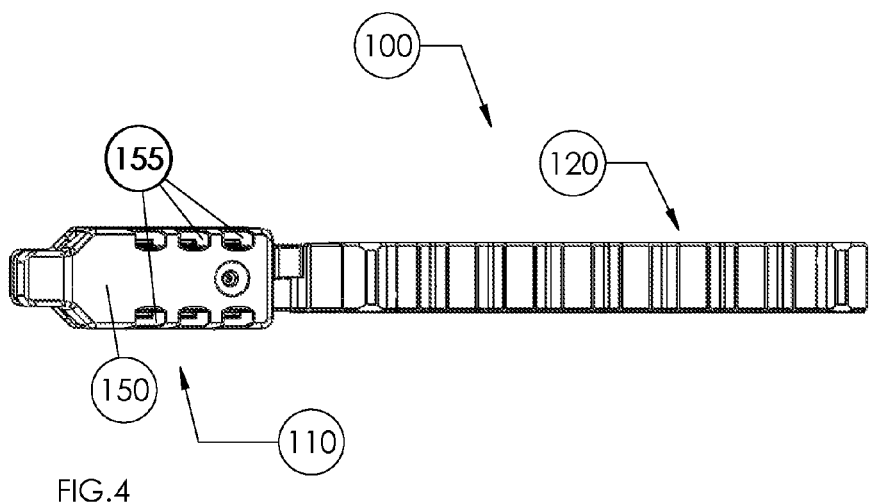
FIG.4

SOLDERING TOOL

CROSS REFERENCE TO RELATED APPLICATION

This application claims priority under 35 USC §119 to U.S. Provisional Patent Application Ser. No. 61/807,166, filed on Apr. 1, 2013, and titled "The Crolder-Soldering Iron that Crimps," the entire contents of which are hereby incorporated by reference.

BACKGROUND

Technical Field

The present disclosure relates generally to a soldering hand tool.

Description of Related Art

In general, soldering is carried out by securing two work pieces together and joining the two work pieces by melting a solder material between the work pieces. Typical soldering material is an alloy having a melting point lower than the work pieces being joined. Soldering tools may be used to heat up the work pieces and melt the soldering material. Soldering tools are embodied in a variety of configurations. Examples of hand-soldering tools include a soldering iron, soldering gun, soldering pen, soldering torch, and the like. Such tools commonly have an electrically-heated soldering tip, which may routinely be used to heat the two or more work pieces to be joined to form a soldered joint. Soldering may be used in electronics, plumbing, metalwork including jewelry, and other fields where joining two or more items, such as metal items, is desired.

In electronics soldering, a soldered joint preferably provides electrical conductivity across the joint and a sufficiently strong mechanical connection to maintain the soldered work pieces together. In other types of metal-working soldering, a soldered joint may preferably exhibit sufficient mechanical strength to hold the soldered work pieces in place with each other.

Work pieces can be secured to each other at a joint by soldering. If the two work pieces are wires, the wires may be twisted together. The work pieces can then be heated. In some forms, a flux material is applied to the heated work pieces. The solder material can then be applied to the heated work pieces, thereby causing the solder to melt and flow around the joint. The heat source may then be removed, while still holding the work pieces together until the solder metal has solidified and the soldered joint is stable. Work pieces are held together until the solder at the joint has sufficiently cooled. In some cases, if the work pieces move relative to each other while the solder is not cooled enough, the resulting joint may crack or otherwise become defective. Such a defective joint may be referred to as a "dry joint." A dry joint may be mechanically weak and/or exhibit high electrical resistance relative to an ideal soldered joint

SUMMARY

In one embodiment, an apparatus for soldering two or more work pieces together is disclosed. The apparatus has a jaw, a heating element at the jaw, a power source, and a handle. The jaw includes a first jaw piece and a second jaw piece. The heating element is positioned at the jaw. The power source can provide an electrical current to the heating element. The handle has a first handle piece and a second handle piece. The first handle piece is rigidly connected to the second jaw piece, forming a first assembly. The second handle piece is rigidly connected to the first jaw piece, forming a second assembly. The first assembly is joined to the second assembly at a pivot.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 2 depicts a side view of a soldering tool according to an embodiment of the present disclosure;

FIG. 3 depicts an end view of a soldering tool according to an embodiment of the present disclosure;

FIG. 4 depicts a top view of a soldering tool according to an embodiment of the present disclosure;

Figure 1:
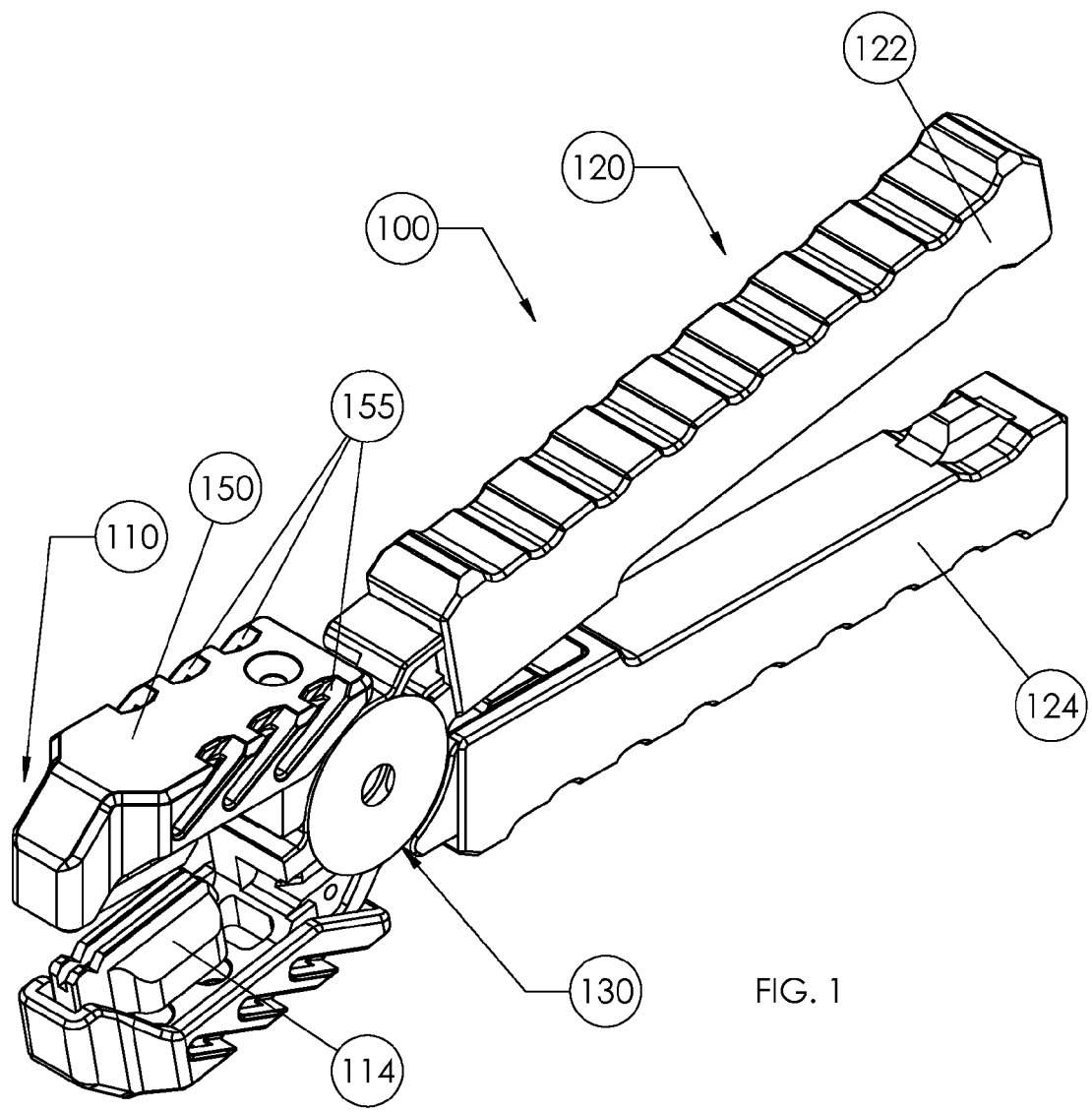
FIG. 1 depicts an isometric projection of a soldering tool according to an embodiment of the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Embodiments of the present disclosure provide methods, apparatus, components, and/or techniques for soldering two or more work pieces together. Referring to FIG. 1, an embodiment of the present disclosure comprises a soldering tool 100. According to embodiments, soldering tool 100 may allow a user to solder two or more work pieces together while securing the work pieces in place with each other. As will be described in further detail, soldering tool 100 may be used to create soldered joints faster and easier than other known methods, leading to a higher degree of repeatability, which may result in increased efficiency and lower production costs.

One embodiment of soldering tool 100 comprises jaw 110 and handles 120. Soldering tool 100 further comprises two levers joined at a pivot 130. Jaw 110 is formed by one end of levers and handles 120 are formed by the other end of levers, opposite the pivot 130 from jaw 110. Jaw comprises two jaw pieces 112 and 114, each jaw piece 112 and 114 comprising an end section of the levers. Jaw pieces 112 and 114 comprise soldering surfaces. In an embodiment, soldering surfaces comprise longitudinal ridges 118 and at least one corresponding opposing groove 119 on at least one jaw piece 112 and/or 114, such that as jaw 110 is closed, ridge 118 nestles into corresponding groove 119. In alternative embodiments, soldering surfaces comprise other configurations adapted to secure work pieces to be soldered together. In one embodiment, groove 119 comprises a longitudinal channel from a front surface of jaw piece 114 along the length of jaw piece 114.

In one embodiment, soldering surfaces comprises lateral notch 117. Notch 117 provides a lateral through-hole in jaw piece 114, into which work pieces may be positioned and held for soldering. According to embodiments, notch 117 passes through one or more longitudinal ridges 118.

In embodiments, jaw pieces 112 and 114 comprise a material having relatively high thermal conductivity. In one embodiment, jaw pieces 112 and 114 are made of iron. In embodiments, jaw pieces are nickel or chrome plated. In embodiments, jaw pieces 112 and 114 comprise an iron-plated copper core.

In an embodiment, handles 120 comprise a thermal and electrical insulating material. Embodiments comprise handle gripping surfaces ergonomically conformed to a typical user's hand shape. Handles 120 comprise a first handle piece 122 and a second handle piece 124.

In embodiments, pivot 130 comprises two pivot disks 132 and 134 joined by a pivot pin 136. Pivot disks 132 and 134 rotate about pivot pin 136 as a user opens and closes handles 120, thus opening and closing jaw 110. In embodiments, a spring (not shown) can apply an opening force to handles 120 and/or jaw 110, which can be countered by the user squeezing handles 120 to close handles 120 and jaw 110. According to various embodiments, handles 120 are relatively longer than jaw 110.

In one embodiment, first handle 122, pivot disk 132, and jaw piece 114 are rigidly connected, forming a first tool assembly. In the same embodiment, second handle 124, pivot disk 134, and jaw piece 112 are rigidly connected, forming a second tool assembly. When pivot disks 132 and 134 are connected at pivot pin 126, the first and second tool assemblies form a lever mechanism, by which a user may close jaw 110 and apply a crimping force on an object within jaw 110 by closing and squeezing handles 120.

Figure 5:
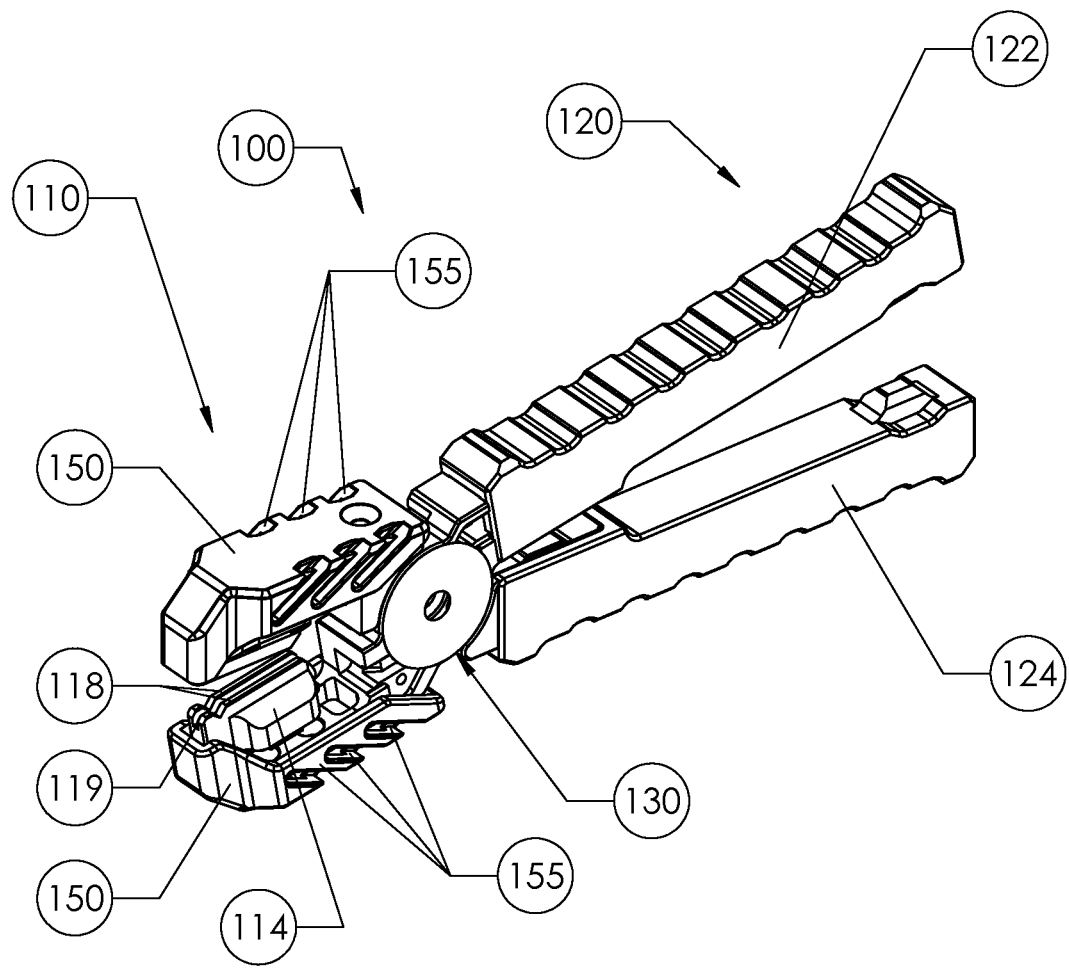
FIG. 5 depicts an exploded front-side view of heating elements of a soldering tool according to an embodiment of the present disclosure.
Figure 6:
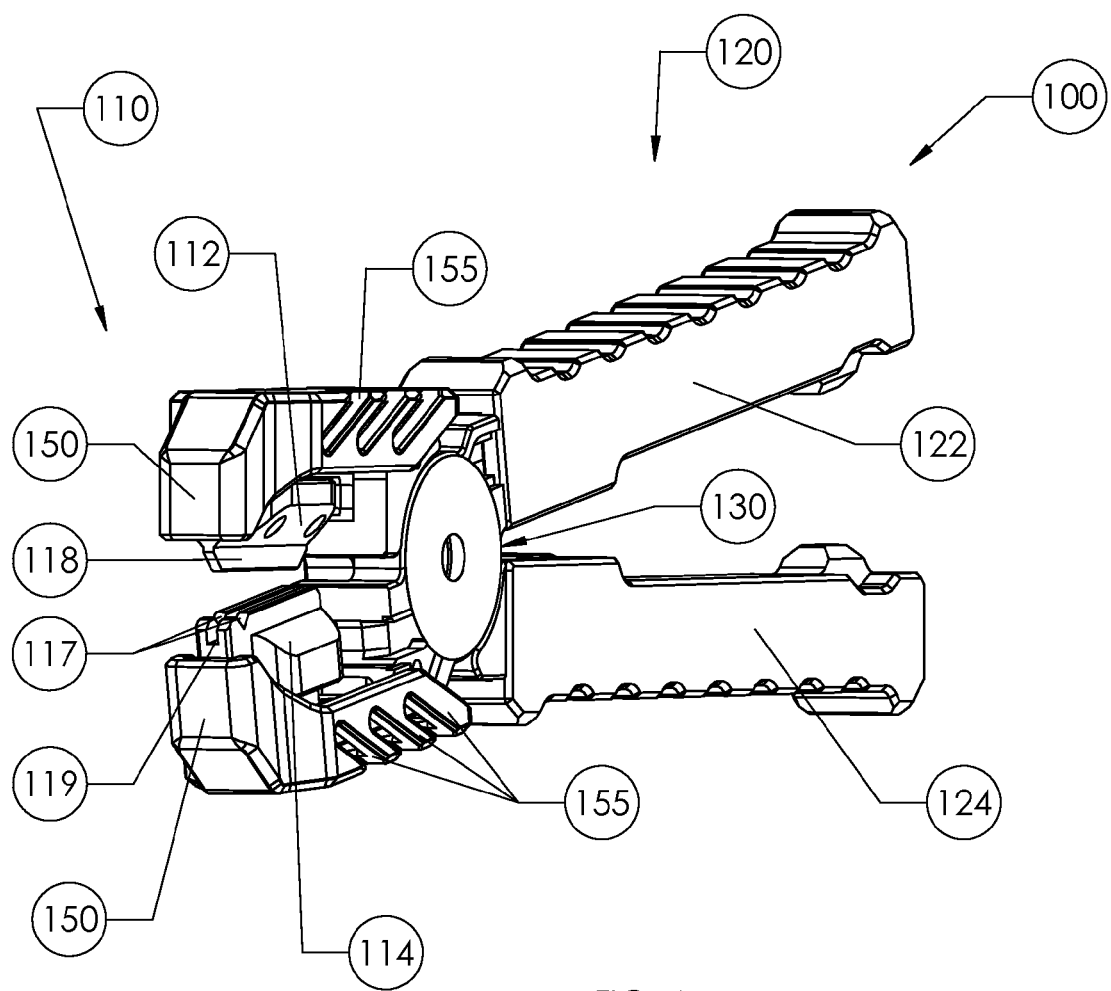
FIG. 6 depicts an exploded rear-side view of heating elements of a soldering tool according to an embodiment of the present disclosure.
Figure 7:
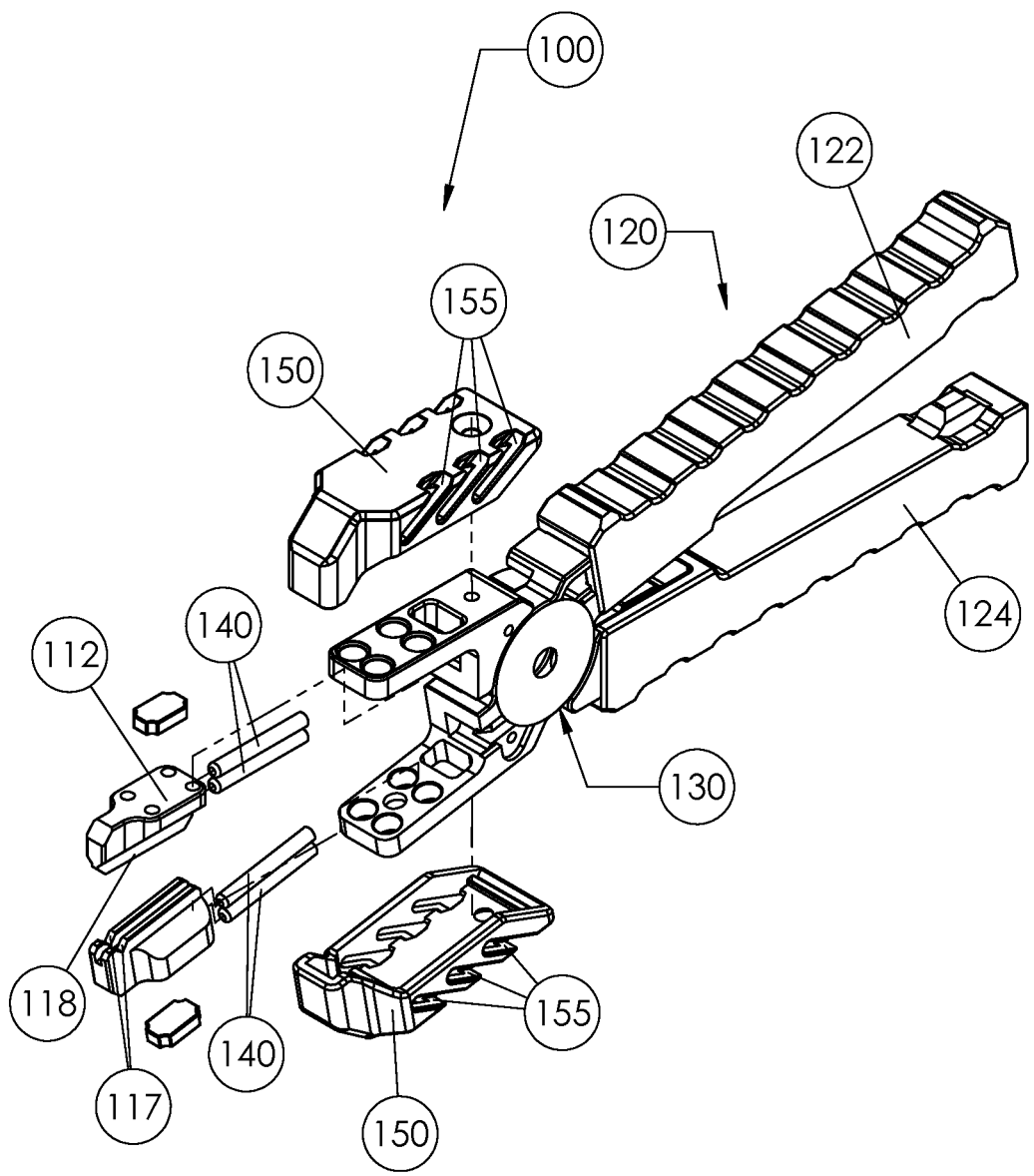
FIG. 7 depicts an exploded view of gripping elements of a soldering tool according to an embodiment of the present disclosure.

Embodiments of soldering tool 100 comprise a heat source at heat jaw 110. Referring now to FIGS. 5 and 6, in an embodiment, heating elements 140 are disposed within jaw pieces 112 and 114. In one embodiment, heating elements 140 comprise ceramic resistive heating elements adapted to generate heat in response to electric current flow therethrough. In another embodiment, heating elements 140 comprise metal resistive heating elements. In another embodiment, heating elements 140 comprise a torch heating element, for example a propane torch. In other embodiments, heating elements 140 may create heat through any other means.

According to embodiments, jaw 110 comprises one or more insulating covers 150 to reduce the risk of burns to the user or other objects from the heated jaw pieces 112 or 114. In various embodiments, cover 150 fully or partially encompasses jaw pieces 112 or 114. Cover 150 comprises vent slots 155 to prevent jaw 110 from overheating while soldering tool 100 is in use.

Figure 8:
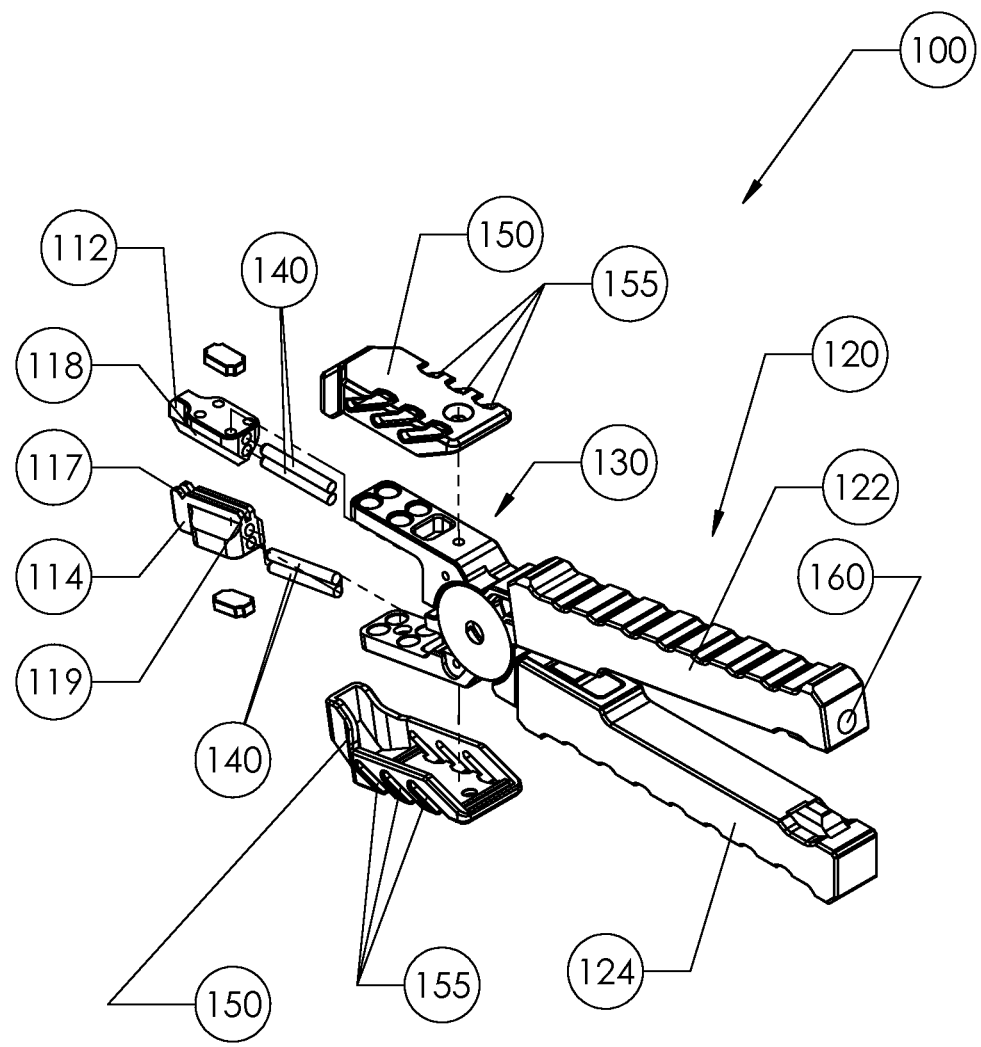
FIG. 8 depicts a side isometric projection of an open soldering tool according to an embodiment of the present disclosure.
Figure 9:
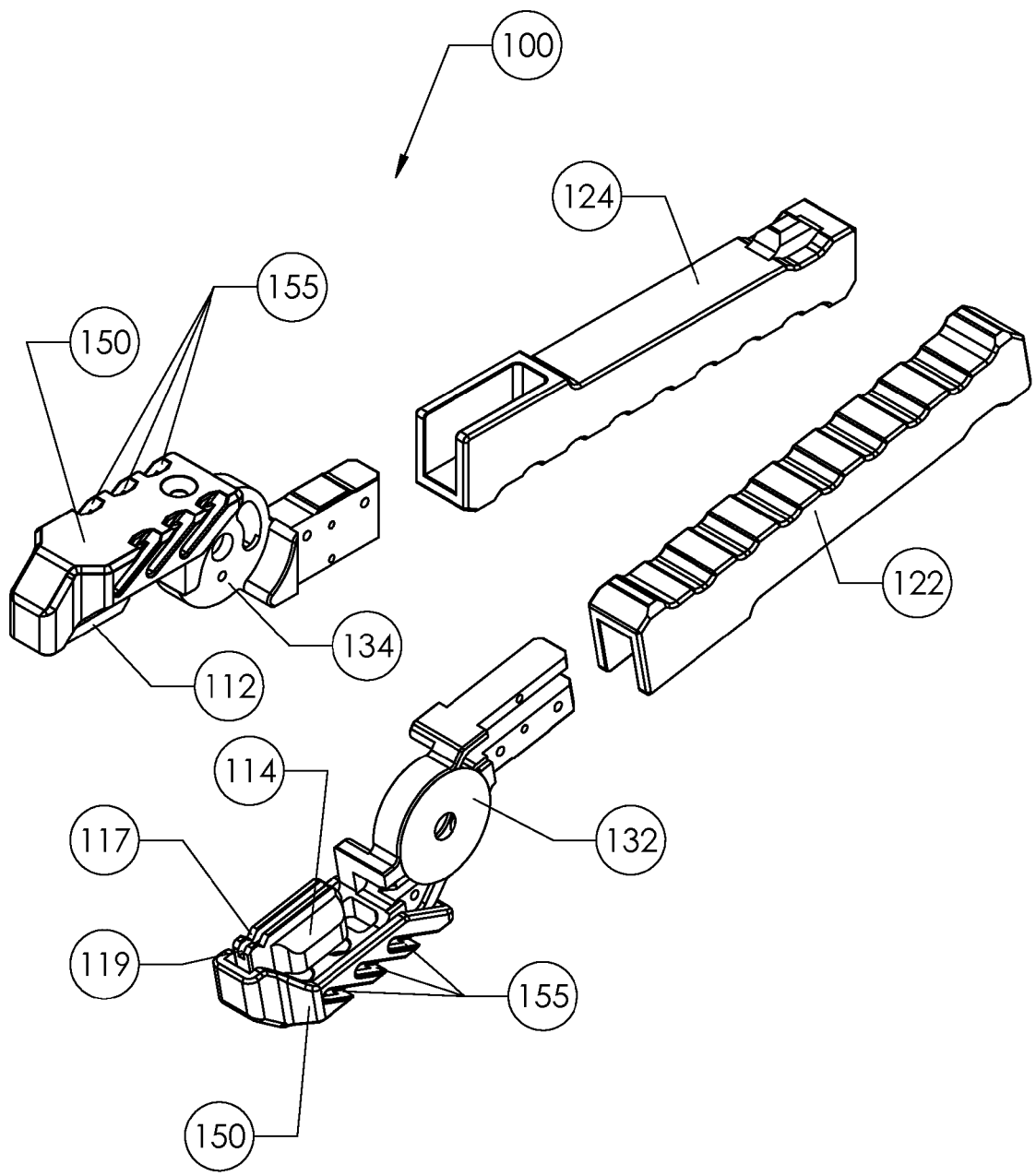
FIG. 9 depicts a front isometric projection of an open soldering tool according to an embodiment of the present disclosure.

Referring now to FIG. 8, embodiments of the present disclosure comprise power connector port 160. In the embodiment depicted, power connector port 160 comprises an input for receiving electric power from a power source. In some embodiments, the power source comprises a battery pack in electrical communication with power connector port 160. In one embodiment, the battery pack connects to power connector port 160 via a connector cord having a Dean's connector. In other embodiments, other types of connections, sockets, and the like are used to supply an electric current to tool 100. According to various embodiments, the battery pack is a rechargeable and/or interchangeable battery pack such as those commercially available for hand-operated power tools. In other embodiments, other types of electrical connectors are used to provide electrical connection between a power source and power connector port 160. In one embodiment, a battery pack includes a clip for mounting to a user's belt or other clothing. In such an embodiment, the connector cord is long enough to allow free movement of soldering tool 100 in the user's hand while the battery is mounted on the user's belt. Alternative embodiments comprise a plug to connect to an alternating current (AC) power source such as a wall outlet. One embodiment of a soldering tool may be switched between various forms of electrical power. In some embodiments, tool 100 may be supplied electric power from a generator.

Figure 10:
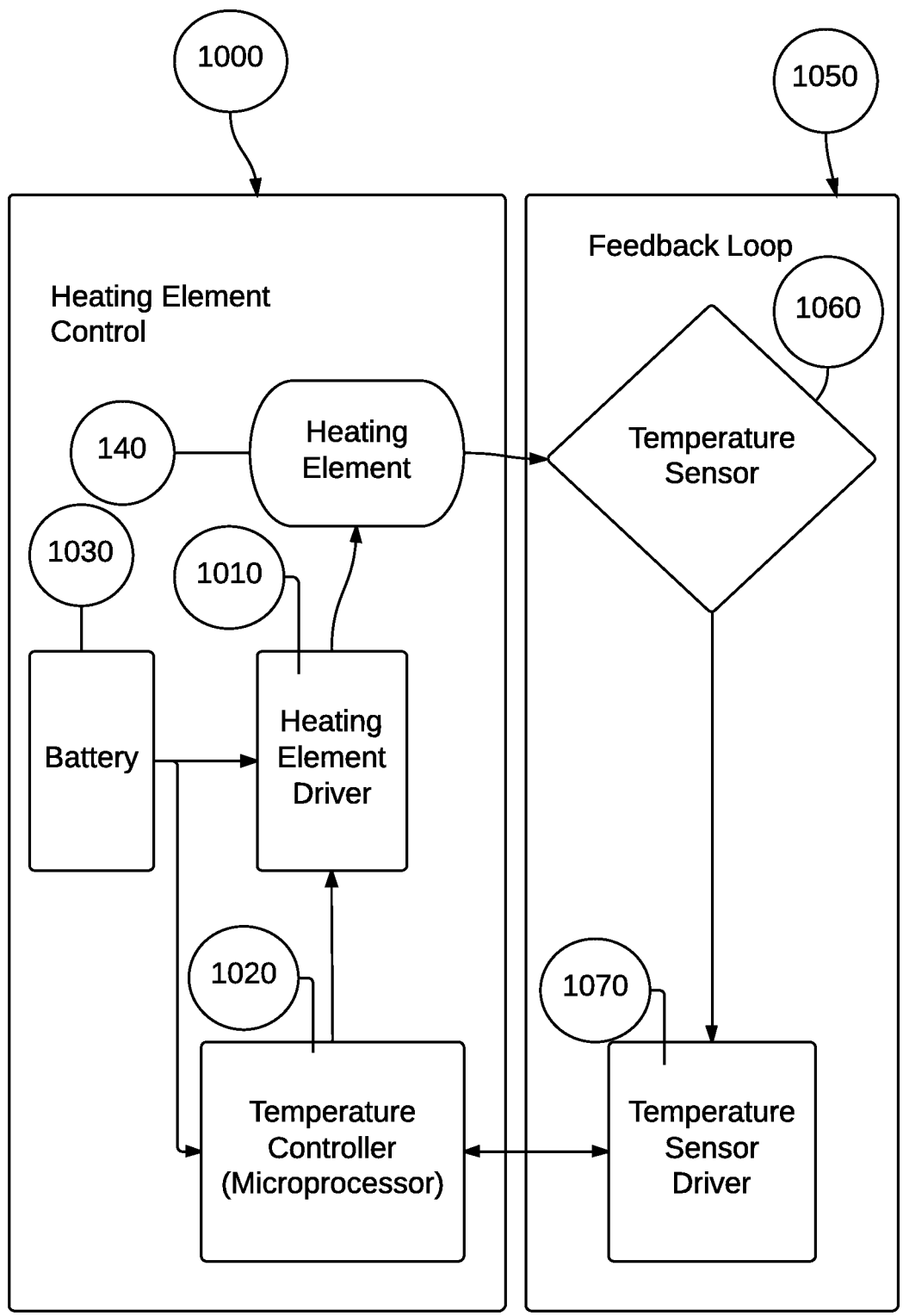
FIG. 10 is a block diagram illustrating one embodiment of the present disclosure.

Referring now to FIG. 10, various embodiments of the present disclosure comprise heating element control circuitry 1000. Heating element control circuitry 1000 comprises heating element 140, heating element driver 1010, temperature controller 1020, and battery 1030. In an embodiment, temperature controller 1020 comprises a microprocessor and computer-readable instructions and data stored on a memory to direct current flow from battery 1030 to heating element driver 1010, which may then drive heating element 140 at a predetermined current or other parameter. In another embodiment, a user may select a desired temperature level. In response, temperature controller 1020 may direct heating element driver 1010 to apply a current level that corresponds to the user-selected temperature level. Power may be cycled on and off at heating element driver 1010 to maintain temperature sufficiently above a target temperature while not exceeding a maximum desired temperature. For example, in embodiments, it may be desirable to maintain the temperature of the jaw 110 above the melting point of solder material but below the melting point of the work pieces to be soldered. In one embodiment, upon powering on, heating elements 140 are powered on until a set target temperature is met. Upon meeting a target temperature, less current may be passed through heating elements 140 in order to maintain temperature at the target.

Some embodiments additionally include feedback loop 1050. Feedback loop 1050 comprises temperature sensor 1060 and temperature sensor driver 1070. Temperature sensor 1060 is adapted to detect the temperature of heating element 140 and transmit a signal to temperature sensor driver 1070 that corresponds to the measured temperature. Temperature sensor driver 1070 can subsequently transmit a signal to temperature controller 1020 relating the measured temperature. As temperature data is received by temperature controller 1020, a comparison between the measured temperature and a target temperature may be carried out. If the measured temperature is less than the target temperature, the heating element driver 1010 may be directed to increase power to heating element 140 until the target temperature is reached or exceeded. If the measured temperature is greater than the target temperature, the heating element driver 1010 may be directed to power down heating element 140 until the measured temperature falls below or near the target temperature.

In one embodiment of the present disclosure, an indicator light is adapted to activate while electrical current is being applied heating element 140, so that the user may know that jaw 110 is heating up. In another embodiment, an indicator light activates whenever jaw 110 is above a threshold temperature, so that the user may know that the jaw 110 is hot enough to solder. In one embodiment, a temperature readout is displayed to the user.

In operation, solder tool 100 can assist a user to quickly and conveniently solder two or more work pieces together. The heating elements 140 and/or jaw pieces 112 and 114 of solder tool 100 may be heated in order to melt solder onto two or more work pieces to be joined. In embodiments, the jaw pieces 112 and/or 114 may be heated to a temperature slightly higher than the melting point of the solder to be used. The work pieces to be joined may then be secured together between the heated jaw pieces 112 and 114. In one embodiment, the work pieces to be joined may pass or partially pass through notch 117 before the user closes the jaw 110. The user may squeeze the handles 120 together while the work pieces are within the jaw 110 to compress the work pieces.

Conductive heating from jaw pieces 112 and/or 114 then heats the work pieces to a temperature slightly higher than the melting point of the solder. The compression may be applied to the work pieces while heat is applied. The user may then apply solder at the junction between the work pieces. The solder can melt from the heat of the work pieces to be joined. Melted solder may then be drawn around the work pieces at the joint by capillary action. The user may then release the compression pressure of the jaw 110, open the jaw 110, and move soldering tool 100 away from the newly-formed joint, allowing the solder to cool and fully solidify. As one of ordinary skill in the art having the benefit of this disclosure, various solder types and alloys may be used with soldering tool 100.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An apparatus for soldering two or more work pieces together comprising:
    a jaw comprising a first jaw piece and a second jaw piece;
    a heating element at the jaw;
    a vented insulating cover partially encompassing at least one of the first jaw piece and the second jaw piece;
    a power source adapted to provide an electrical current to the heating element; and
    a handle comprising a first handle piece and a second handle piece, wherein:
        the first handle piece is rigidly connected to the second jaw piece, forming a first assembly;
        the second handle piece is rigidly connected to the first jaw piece, forming a second assembly; and
        the first assembly is joined to the second assembly at a pivot.

2. The apparatus of claim 1, wherein the jaw comprises a gripping surface having a longitudinal ridge.

3. The apparatus of claim 1, wherein the jaw comprises a lateral notch.

4. The apparatus of claim 1, further comprising a removable vented insulating cover partially encompassing at least one of the first jaw piece and the second jaw piece.

5. The apparatus of claim 1, wherein the heating element is within a jaw piece.

6. The apparatus of claim 1, wherein the power source comprises a detachable battery pack.

7. The apparatus of claim 1, wherein the heating element comprises a ceramic heating element.

8. The apparatus of claim 1, wherein the jaw has a relatively shorter length than the handle.

9. A method of soldering work pieces together, comprising:
    gripping the work pieces within a jaw of a soldering tool, the soldering tool comprising:
        a first jaw piece and a second jaw piece;
        a heating element at the jaw;
        a vented insulating cover partially encompassing at least one of the first jaw piece and the second jaw piece;
        a power source adapted to provide an electrical current to the heating element; and
        a handle comprising a first handle piece and a second handle piece, wherein:
            the first handle piece is rigidly connected to the second jaw piece, forming a first assembly;
            the second handle piece is rigidly connected to the first jaw piece, forming a second assembly; and
            the first assembly is joined to the second assembly at a pivot;
    compressing the work pieces with the jaw;

heating the jaw, thereby conductively heating the work pieces;

applying a solder to the work pieces; and releasing the jaw.

10. The method of claim 9, further comprising compressing the work pieces with the jaw while heating the work pieces.

11. The method of claim 9, wherein gripping the work pieces within the jaw of the soldering tool comprises placing the work pieces within a lateral notch of the jaw.

12. The method of claim 9, wherein compressing the work pieces with the jaw comprises squeezing the handle of the soldering tool.

13. A soldering tool apparatus comprising:

a jaw comprising a first jaw piece and a second jaw piece;

a heating element within the jaw;

a handle comprising a first handle piece and a second handle piece;

a power source;

a vented insulating cover partially encompassing at least one of the first jaw piece and the second jaw piece; and control circuitry adapted to direct current from the power source to the heating element while the jaw is below a selected temperature;

wherein:

the first handle piece is rigidly connected to the second jaw piece, forming a first assembly;

the second handle piece is rigidly connected to the first jaw piece, forming a second assembly;

the first assembly is joined to the second assembly at a pivot;

the jaw comprises two opposing crimping surfaces; and the heating assembly is adapted to heat the two opposing crimping surfaces.

14. The apparatus of claim 13, wherein the crimping surfaces further comprise a longitudinal ridge and corresponding longitudinal groove.

15. The apparatus of claim 13, wherein the jaw comprises a lateral through-hole.

16. The apparatus of claim 13, further comprising a removable vented insulating cover partially encompassing at least one of the first jaw piece and the second jaw piece.

17. The apparatus of claim 13, wherein the power source comprises a detachable battery pack.

18. The apparatus of claim 13, wherein the heating element comprises a ceramic heating element.

19. The apparatus of claim 13, wherein the heating element comprises a first heating element member and a second heating element member, wherein the first heating element member is within the first jaw piece and the second heating element member is within the second jaw piece.

* * * * *